June 12, 1951      H. P. DEITZ      2,556,683
FISHING LURE
Filed July 7, 1949
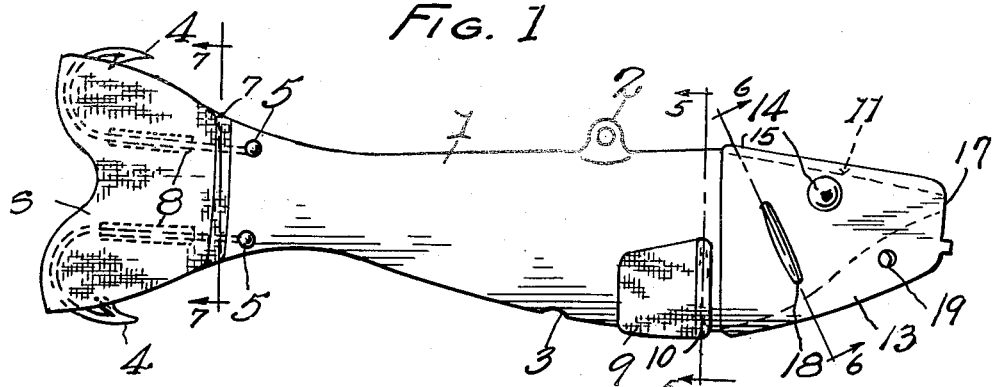
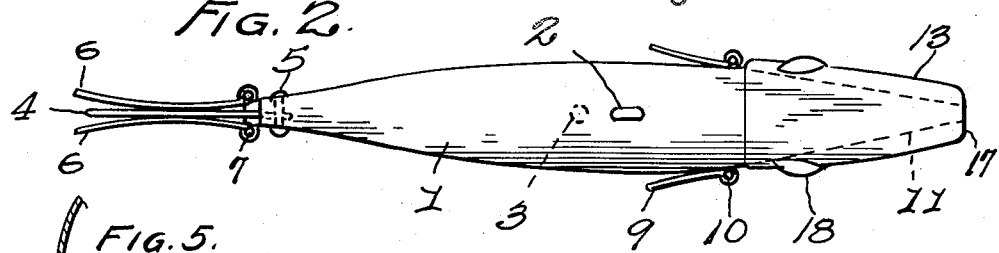
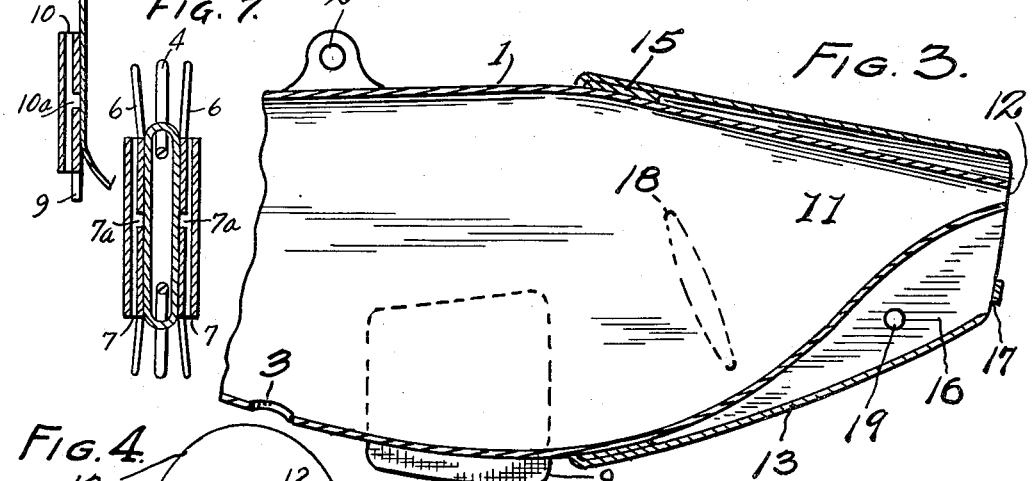
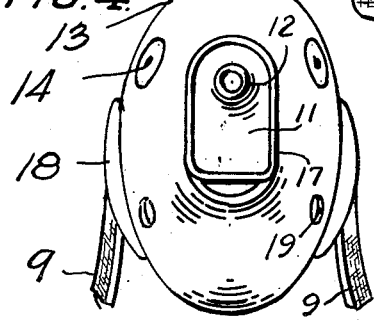
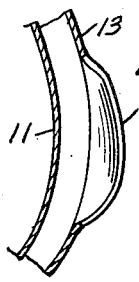
INVENTOR.
HENRY P. DEITZ
BY
Charles K. Davis & Son
ATTORNEYS Patented June 12, 1951

2,556,683

UNITED STATES PATENT OFFICE 2,556,683

FISHING LURE

Henry P. Deitz, West Hyattsville, Md.

Application July 7, 1949, Serial No. 103,466

5 Claims. (Cl. 43—42.06)

The present invention relates to the general class of fishing including artificial bait, fishing lures, and small fish-bait designed for use in fishing for large fish, and more specifically to an improved fishing lure simulating a minnow or other small fish, that may be wave or current activated, and which is equipped with means for flexing its fins, and forming air bubbles to exhibit life-like breathing, resulting in simulated natural motions when the bait is in use.

The simulated fish of the invention includes a minimum number of parts that may with facility be manufactured at low cost of production, and the parts may be assembled with convenience to provide a durable lure that is well balanced for passage through the fishing waters, and efficient in the performance of its functions.

The invention consists in certain novel features of construction and combinations of parts as will hereinafter be described and more particularly set forth in the appended claims.

In the accompanying drawings I have illustrated a complete example of a physical embodiment of my invention in which the parts are combined in accord with one mode I have devised for the practical application of the principles of the invention. It will however be understood that changes and alterations are contemplated and may be made in these exemplifying drawings and structures, within the scope of my claims, without departing from the principles of the invention.

Figure 1 is a view in side elevation of a fishing lure in which my invention is embodied.

Figure 2 is a top plan view.

Figure 3 is an enlarged longitudinal sectional view showing the interior construction of part of the lure; and Figure 4 is a face view or front view of the lure.

Figure 5 is a sectional view at line 5—5 of Fig. 1.

Figure 6 is a sectional view at line 6—6 of Fig. 1.

Figure 7 is a sectional view at line 7—7 of Fig. 1.

In carrying out my invention I employ a hollow body 1 that simulates a small fish, manufactured from light sheet metal, or other suitable material, which forms an interior water-and-air chamber; and the lure is provided with an attaching eye 2 located at the center of gravity, to which the fishing line may be attached, and from which the bait is suspended in life-like position for travel through the fishing waters.

At a lower portion, or in the bottom of the hollow body, a comparatively small hole, orifice, or entry port 3 for water is provided, through which the water may enter the interior chamber and force bubbles of air from the chamber to simulate breathing of the lure, as will be described.

At the tail-end of the lure a pair of rearwardly projecting and vertically spaced hooks 4 are attached, the shanks of the hooks being securely fastened by transversely arranged rivets as 5, 5, and the hooks are substantially concealed or hidden by a pair of thin flexible tail pieces 6, 6, of textile material, fabric, or other suitable material. These tail pieces may be attached in suitable manner, as by loops or pins 7, 7, rigid with the rear end of the lure, and the tail pieces may be stitched together at 8, 8, to enclose and hold the pieces against the hook-shanks, leaving only the barbs of the hooks visible.

By anchoring the front ends of the tail pieces to the rear end of the body of the lure, and stitching or otherwise securing opposed portions of the tail pieces to the longitudinally extending shanks of the fish-hooks, the flexible rear ends and the upper and lower portions of the tail-pieces are free to flex as the lure is drawn through the water, and while the lure remains still in the water these flexible portions may also be flexed by passing water currents.

For simulating the side fins of a fish, a pair of lateral fins as 9, 9, of the same material as the flexible tail pieces, are attached, as at 10, 10, to the opposite sides of the lure; and both the tail pieces and the fins are flexed and activated by waves or currents while the lure is in use in the water. At their central portions the pins 7 and 10, respectively, may be spot-welded at 7a and 10a to the outer sides of the lure and the front edges of the tail-pieces and fins are wrapped around the pins, and secured thereto as by stitching.

As best seen in Fig. 3 the hollow body forming the water-and-air chamber, terminates at the front in a pointed nose 11, of conical or converging shape, and the nose ends in a small hole or air outlet 12. By this construction and arrangement of parts, when the lure is immersed, water may enter the entry port 3 into the interior of the body and force air from the hollow body through the air outlet port 12, to form bubbles, and thus simulate breathing of the lure.

The front end or nose of the body 1 is covered by a sheath or head 13 having painted eyes 14, and the head, which forms a mouth or water space separated from and surrounding the nose is rigidly attached to the body, as by welding, if metal is employed, as at 15. The interior of the head forms a chamber or mouth 16 having lips 17 that surround the air outlet or bubble port from the body; and the head is provided with gill-slots 18, struck up or pressed from the material of the head, to form rearwardly opening water outlets. Thus, water entering the mouth opening of the lure flows outwardly through the gill-slots, and the currents thus created cause the flexible fins 9, 9, to simulate the movements of the fins of a natural fish.

In cork-line fishing, when the lure is suspended at its center of gravity by the eyelet 2, the suspending line and the cork rise and fall with the surface waves and the lure swings in a vertical plane with the eyelet as a center. This movement of the bait flexes the tail pieces and the fins, and the movement of water in the hollow body causes air to be expelled through the port 12 to form bubbles.

The head, at the rear of the lips is also provided with a pair of holes 19 that may selectively be used for attaching a line to be used when trolling, or the trolling line may be attached to the lip or mouth piece 17 for a straight pull of the lure through the water.

Having thus fully described my invention, what I claim as new and desire to secure by Letters Patent is:

1. In a fishing lure of the bubbling type, the combination with a hollow body forming a water-and-air chamber and simulating a fish, and said body having a rear lower water inlet and a front upper air outlet, of an exterior head spaced around the front portion of the body and the air outlet, said head having an open mouth and lateral gill-slots for passage of water, and flexible side-fins mounted on the body at the rear of the gill-slots.

2. In a fishing lure simulating a fish, the combination with a hollow body forming a water-and-air chamber and terminating in a pointed nose having a reduced air outlet, and said body having a water inlet port located below the air outlet, of an exterior head spaced from and surrounding the pointed nose to form a water chamber, said head having an open mouth and a pair of lateral gill-slots for passage of water, and flexible side fins mounted on the body at the rear of the gill-slots and adjacent thereto, whereby water passing outwardly through the gill slots will cause the fins to simulate the movement of the fins of a natural fish.

3. In a fishing lure, the combination with a hollow body simulating a fish and having a bottom water inlet port, said body terminating in a converging nose portion having a front air outlet port, of an exterior head spaced from and surrounding the nose to form a water passage, said head having a mouth opening to the passage and lateral slots opening from the passage, and flexible side fins mounted on the exterior of the body at the rear of the slots.

4. In a fishing lure of the bubble-forming type, the combination with a hollow body simulating a fish and forming a water-and-air chamber, and the walls of said body having means adapted to admit water and expel air to form bubbles, of flexible side fins mounted on the exterior of the body, an exterior open-front head spaced from and surrounding the front portion of the chamber to form a water passage, and said head having outlet ports located in front of the fins and adapted to discharge water from the passage to flex the fins.

5. In a fishing lure the combination with a hollow body simulating a fish, and a pair of vertically spaced hooks having longitudinally extending shanks mounted at the rear end of the body, of a pair of flexible tail-pieces attached at their front ends to the rear end of the body and substantially concealing the hooks, said tail-pieces also having opposed portions attached to said shanks, a pair of flexible side fins attached to the body, said body terminating in a reduced front nose portion having an air outlet, and said body also having a bottom water inlet port, for the purpose described.

HENRY P. DEITZ.

REFERENCES CITED

The following references are of record in the file of this patent:

UNITED STATES PATENTS

| Number | Name | Date |
|---|---|---|
| 2,229,369 | Buettner | Jan. 21, 1941 |
| 2,317,781 | Lehto | Apr. 27, 1943 |